United States Patent
Imajo et al.

(12)
(10) Patent No.: US 6,807,374 B1
(45) Date of Patent: Oct. 19, 2004

(54) MOBILE COMMUNICATION SYSTEM

(75) Inventors: Yoshihiro Imajo, Eniwa (JP); Masaru Nara, Hachiouji (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/570,044

(22) Filed: May 12, 2000

(30) Foreign Application Priority Data

May 14, 1999 (JP) .......................................... 11-133537
Mar. 24, 2000 (JP) ...................................... 2000-084022

(51) Int. Cl.[7] .............................................. H04B 10/00
(52) U.S. Cl. ..................................... 398/115; 379/56.2
(58) Field of Search ................................ 398/115, 116, 398/117; 379/56.1, 56.2, 56.3

(56) References Cited

U.S. PATENT DOCUMENTS 5,424,864 A * 6/1995 Emura ......................... 398/116
5,809,395 A * 9/1998 Hamilton-Piercy et al. . 725/106
6,496,290 B1 * 12/2002 Lee .............................. 398/78

* cited by examiner

Primary Examiner—Jason Chan
Assistant Examiner—Christina Y Leung
(74) Attorney, Agent, or Firm—Wenderoth, Lind & Ponack, L.L.P.

(57) ABSTRACT

An optical transmission system for mobile communication compensates for disadvantages of the star type and the multicipital type systems. In the system, a radio modem for per forming modulation/demodulation between a circuit frequency electrical signal and a radio frequency electrical signal is connected to a network through an electrical signal transmission cable, a central station for performing conversion between a radio frequency electrical signal and an optical signal is connected to a relay-transmitting station for distributing and coupling optical signals through downward and upward optical fiber cables, a plurality of terminal stations for performing radio communication with a mobile communication unit and conversion between an electrical signal and an optical signal are connected to the relay-transmitting station through downward and upward optical fiber cables, the central station is connected with the relay-transmitting station by a small number of optical fiber cables, and the relay-transmitting station is connected with a plurality of terminal stations by optical fiber cables so that the terminal stations are independent from each other.

1 Claim, 8 Drawing Sheets

Trunk road or the like

MOBILE COMMUNICATION SYSTEM

BACKGROUND OF THE INVENTION

1. Field of the Invention

The present invention relates to collection and delivery of radio frequency signals using an optical transmission system, and particularly to an optical transmission system for mobile communication for transmitting radio signals to a mobile communication unit present in a dead zone at which a radio wave does not easily arrive, such as the inside of a tunnel, inside of a underground street, or inside of a building.

2. Description of the Related Art

A mobile communication system, such as an automobile telephone or portable telephone, makes it possible for a mobile communication unit to perform communication through a public network by radio-connecting to a base station connected to a host network (in the following description, the public network is used as an example) with the mobile communication unit.

As for this type of mobile communication system, preferable radio communication with a base station is realized when a mobile communication unit is present at the outdoors at which a radio wave easily arrives. However, when the mobile communication unit is present in a dead zone at which a radio wave does not easily arrive, such as the inside of an underground street, it is impossible to perform radio communication with the base station.

To solve the above problem, the following improvements have been made: an improvement of setting an antenna to a place where radio communication can be preferably performed with a base station and moreover setting an antenna in a dead zone, cable-connecting a relay amplifier between the both antennas to realize communication between a mobile communication unit present in a dead zone and the base station and an improvement of cable-connecting a radio modem directly connected with a public network with an antenna set in a dead zone to realize communication between a mobile communication unit present in the dead zone and the public network.

Moreover, because it is necessary to efficiently transmit a radio frequency signal in a band of 800 MHz or 1.5 GHz used for portable telephones, a lightweight, flexible, and small-loss optical fiber cable is used for connection between a relay amplifier or radio modem and an antenna instead of a metal cable.

In this case, systems for performing transmission by using the optical fiber cable can be classified into the star type and the multicipital type and the both types of systems are described in, for example, Tsubosaka et al. "Optical Transmitter for PDC" (Matsushita Technical Journal Vol. 44, No. 6 (December, 1998)).

Conventional optical transmission systems using a radio modem are described below by referring to FIGS. 7 and 8.

FIG. 7 shows a star-type optical transmission system for mobile communication. This system is provided with a radio modem 3 connected with a public network 1 through an electrical signal transmission cable 2 constituted of a metal cable, a central fixed station 5 connected with the radio modem 3 through an electrical signal transmission cable 4, and a plurality of terminal fixed stations 7 connected with the central fixed station 5 through an optical transmission cable constituted of a pair of downward optical fiber cables 6a and a pair of upward optical fiber cables 6b.

In the case of this optical transmission system for mobile communication, a mobile communication unit 8 present in a dead zone is connected to the public network 1 through the radio modem 3 by making the terminal fixed station 7 set in the dead zone radio communicate with the mobile communication unit 8 and connecting the terminal fixed station 7 and the central fixed station 5 by an optical transmission cable.

That is, in the case of downward (direction from the network 1 to the mobile communication unit 8) communication in the optical transmission system for mobile communication, a circuit frequency electrical signal sent from the public network 1 is modulated into a radio frequency electrical signal by a modulating-transmitting section 31 of the radio modem 3, the radio frequency electrical signal is converted into an analog optical signal by an electrical-optical converter (E/O) 51 of the central fixed station 5, and moreover the analog optical signal is branched into a plurality of optical signals by a star coupler 52 and transmitted to each terminal fixed station 7 through each downward optical fiber cable 6a. Then, the terminal fixed station 7 reconverts the received optical signal to the original radio frequency electrical signal by an optical-electrical converter (O/E) 71, amplifies the radio frequency electrical signal by an amplifier 72 according to necessity, and radio-transmits the amplified signal to the mobile communication unit 8 from an antenna 73.

In the case of upward (direction from the mobile communication unit 8 to the network 1) communication in the optical transmission system for mobile communication, a radio frequency electrical signal radio-transmitted from the mobile communication unit 8 is received by an antenna 73 of the terminal fixed station 7, the received radio frequency electrical signal is amplified by an amplifier 74 according to necessity, the radio frequency electrical signal is converted into an analog optical signal by an electrical-optical converter (E/O) 75, and the optical signal is transmitted to the central fixed station 5 through the upward optical fiber cable 6b. Symbol 76 in FIG. 7 denotes an antenna-sharing unit for using the antenna 73 as a transmitting antenna and a receiving antenna. Moreover, the central fixed station 5 reconverts optical signals received from the upward optical fiber cables 6b into the original radio frequency electrical signals by optical-electrical converters (O/E) 53, couples these radio frequency electrical signals by a coupler 54, and transmits a synthesized signal to the radio modem 3. The radio modem 3 demodulates the radio frequency electrical signals into electrical signals having a circuit frequency by a receiving-demodulating section 32 and transmits them to the public network 1.

FIG. 8 shows a multicipital optical transmission system for mobile communication. The system is provided with a radio modem 3 connected with a public network 1 through an electrical signal transmission cable 2 constituted of a metal cable, a central fixed station 5 connected with the radio modem 3 through an electrical signal transmission cable 4, and a plurality of terminal fixed stations 7 connected to an optical transmission cable constituted of a downward optical fiber cable 6a and an upward optical fiber cable 6b and connected with the central fixed station 5.

Also in the case of this optical transmission system for mobile communication, a mobile communication unit 8 present in a dead zone is connected to the public network 1 through the radio modem 3 by making the terminal fixed stations 7 set in the dead zone radio communicate with the mobile communication unit 8 and connecting the terminal fixed stations 7 with the central fixed station 5 by an optical transmission cable.

In the case of downward communication in this multicipital optical transmission system for mobile communication, an analog optical signal modulated by a modulating-transmitting section 31 of the radio modem 3 and converted into the analog optical signal by an electrical-optical converter (E/O) 51 of the central fixed station 5 is transmitted to each terminal fixed station 7 through the single downward optical fiber cable 6a without being branched. That is, each terminal fixed station 7 takes out some of optical signals from the optical fiber cable 6a by an optical directional coupler 77, reconverts the optical signals into the original radio frequency electrical signals by an optical-electrical converter (O/E) 71, and amplifies the radio frequency electrical signals by an amplifier 72 according to necessity, and radio-transmits the amplified signals to the mobile communication unit 8 from an antenna 73.

Moreover, in the case of upward communication in the multicipital optical transmission system for mobile communication, a radio frequency electrical signal received from the mobile communication unit 8 by the antenna 73 of the terminal fixed station 7 is amplified by an amplifier 74 according to necessity, the amplified radio frequency electrical signal is converted into an analog optical signal by an electrical-optical converter (E/O) 75, and then the optical signal is supplied to the upward optical fiber cable 6b, coupled with an optical signal sent from other terminal fixed Station by coupler 78, and transmitted to the central fixed station 5. Then, the central fixed station 5 reconverts an optical signal received from each upward optical fiber cable 6b into the original radio frequency electrical signal by an optical-electrical converter (O/E) 53, demodulates the radio frequency electrical signal into a circuit frequency electrical signal by a receiving-demodulating section 32 of the radio modem 3, and transmits the electrical signal to the public network 1.

In the case of the above conventional star-type optical transmission system (FIG. 7), each terminal fixed station 7 is connected with the central fixed station 5 by each pair of downward and upward optical fiber cables 6a and 6b. Therefore, each terminal fixed station 7 is independent on an optical wiring and thereby, each terminal fixed station 7 can be set without being restricted by other terminal fixed station and thus, there is a flexibility that each terminal fixed station 7 can be freely moved or removed.

However, the star-type optical transmission system has problems that many optical fiber cables are required and thereby, the cost increases and it is difficult to lay optical fiber cables. For example, it is easier to lay a cable formed by bundling a required number of optical fiber cables and moreover, it is possible to secure the durability of laid optical fiber cables. However, to set a new terminal fixed station, it is difficult to obtain an unused optical fiber cable from an already-laid bundled cable.

Moreover, in the case of the above-described conventional multicipital optical transmission system (FIG. 8), each terminal fixed station 7 is connected with the central fixed station 5 by using optical fiber cables 6a and 6b one each as trunk lines. Therefore, advantages are obtained that a required number of optical fiber cables is decreased compared to the case of the star type, the cost is decreased, and optical fiber cables can be easily laid.

However, the multicipital optical transmission system has problems on occurrence of optical beat noises due to optical coupling of upward optical signals and setting of a distributing ratio of the downward optical coupler 77 and a coupling ratio of an upward optical coupler 78 as described in SUIZAWA et al. "Multicipital optical fiber link for mobile communication to which automatic wavelength offset control is applied" (Technical research report of Institute of Electronics, Information and Communication Engineers, RCS94-70 (September, 1994)).

As for the problem on optical beat noises, a frequency component corresponding to the difference in optical frequency of a semiconductor laser normally used as an electrical-optical converter (E/O) is produced as noises in a radio frequency band after optical demodulation. Therefore, to avoid the optical beat noises when performing optical coupling, a problem is caused that the optical frequency of the E/O 75 of each terminal fixed station must be controlled so that the optical frequency is not superimposed on a radio frequency band transmitted by produced beat noises.

Moreover, terminal fixed stations 7 are connected each other by an optical fiber cable in series like one stroke of the brush to perform distributing capture of an optical signal or coupling of optical signals in the middle of the optical fiber cable. However, by keeping an optical signal intensity input to the O/E 71 of each terminal fixed station 7 constant and moreover keeping an optical signal intensity output from the E/O 75 constant, it is possible to make the gain of the amplifier of each terminal fixed station 7 common and reduce the costs for design and fabrication. However, to keep an optical signal intensity constant, it is necessary to set distributing ratios of the downward optical coupler 77 and coupling ratios of the upward optical coupler 78 so that the ratios are different from each other for every terminal fixed station 7. Thereby, to move or remove some terminal fixed stations or add new terminal fixed stations, there are problems that optical distributing ratios and optical coupling ratios of all terminal fixed stations of a system must be adjusted and a flexibility for setting terminal fixed stations is very small.

SUMMARY OF THE INVENTION

The present invention have been arrived at to solve the above problems and its object is to provide an optical transmission system for mobile communication having a novel configuration compensating for disadvantages of the star type and the multicipital type.

More specifically, it is an object of the present invention to realize a flexibility for setting terminal stations without considering optical distributing ratio and coupling ratio differently from the star type and provide an optical transmission system for mobile communication for realizing the easiness for laying optical fiber cables and the profitability of cost like the multicipital type.

Further objects of the present invention will become apparent from the following description.

The present invention is a relay-transmitting station system connected with a plurality of terminal stations for performing radio communication with mobile communication units through optical fiber cables and connected with a converting station for performing modulation/demodulation with a network through an optical fiber cable to perform relay transmission between a terminal station and a converting station in accordance with an optical signal. The station system comprises a plurality of optical-electrical photoelectric converters for converting optical signals transmitted from a terminal station through an optical fiber into electrical signals, a coupler for coupling electrical signals converted by the photoelectric converters, and an electrical-optical photoelectric converter for converting the coupled electrical signal into an optical signal and transmitting the optical signal to the converting station through an optical fiber cable and performs relay transmission without performing light synthesis causing optical beat noises.

Moreover, the present invention is a fixed station system connected with a relay-transmitting station for relay-transmitting a radio signal to be transferred to and from a mobile communication unit in the form of an optical signal through an optical fiber cable and connected with a modem for performing modulation/demodulation with a network by radio or an electrical signal transmitting cable. The fixed station system comprises an electrical-optical photoelectric converter for converting an electrical signal output from the modem into an optical signal to be output to a relay-transmitting station through an optical fiber cable, and an optical-electrical photoelectric converter for converting an optical signal output from a relay-transmitting station through an optical fiber cable into an electrical signal to be output to the modem.

Furthermore, the present invention is a fixed station system connected with a plurality of relay-transmitting stations for relay-transmitting radio signals to be transferred to and from a mobile communication unit in the form of optical signals through optical fiber cables and connected with a modem for performing modulation/demodulation with a network by radio or an electrical signal transmitting cable. The fixed station comprises an electrical-optical photoelectric converter for converting electrical signals received from the modem into optical signals, an optical distributor for distributing the converted optical signal into optical signals to be output to the relay-transmitting stations through optical fiber cables, a plurality of optical-electrical photoelectric converters for converting optical signals output from a plurality of relay-transmitting stations through optical fiber cables into electrical signals, and a coupler for coupling the converted electrical signals into an electrical signal to be output to the modem.

Furthermore, the present invention is a fixed station system connected with a plurality of relay-transmitting stations for transmitting radio signals to be transferred to and from a mobile communication unit in the form of optical signals through optical fiber cables and connected with a modem for performing modulation/demodulation with a network by radio or an electrical signal transmission cable to make different receiving-demodulating sections provided for the modem apply reception-diversity processing to signals received from the mobile communication unit transmitted via different relay-transmitting stations. The fixed station system comprises an electrical-optical photoelectric converter for converting electrical signals output from the modem into optical signals, an optical distributor for distributing the converted optical signal into optical signals to be output to the relay-transmitting stations through optical fiber cables, and a plurality of optical-electrical photoelectric converters for converting optical signals output from a plurality of relay-transmitting stations through optical fiber cables into electrical signals to be output to different receiving-demodulating sections of the modem.

Furthermore, the present invention is a converting-station system comprising a fixed station system connected with a relay-transmitting station system for relay-transmitting a radio signal to be transferred to and from a mobile communication unit in the form of an optical signal through an optical fiber cable and a modem for performing modulation/demodulation with a network to photoelectrically convert and modulate/demodulate signals according to a plurality of communication systems, wherein the fixed station system has a downward photoelectric converter for converting an electrical signal output from the modem into an optical signal to be output to a relay-transmitting station through an optical fiber cable and an upward photoelectric converter for converting an optical signal output from the relay-transmitting station through an optical fiber cable into an electrical signal to be output to the modem and the modem has a plurality of modulating-transmitting sections different from each other in communication system for modulating a circuit frequency electrical signal received from the network into a radio frequency electrical signal and outputting the electrical signal to the relay-transmitting station system and a plurality of demodulating-receiving sections different from each other in communication system for demodulating a radio frequency electrical signal output from the relay-transmitting station system into a circuit frequency electrical signal and outputting the electrical signal to the network, and further comprising a coupler for coupling radio frequency electrical signals output of a plurality of modulating-transmitting sections and outputting a coupled signal to a downward photoelectric converter of the fixed station system and a distributor for distributing radio frequency electrical signals output from the upward photoelectric converter to a plurality of demodulating-receiving sections.

Furthermore, the present invention is a portable telephone system comprising a radio modem connected with a network to perform modulation/demodulation between a circuit frequency electrical signal and a radio frequency electrical signal, a central fixed station system connected to the radio modem to perform conversion between a radio frequency electrical signal and an optical signal, a relay-transmitting station system connected to the central fixed station system through an optical fiber cable to relay-transmit an optical signal, and a terminal station system connected to the relay-transmitting station system through an optical fiber cable to perform conversion between an optical signal and a radio frequency electrical signal and moreover perform radio communication with a portable telephone in accordance with a radio frequency electrical signal, wherein a plurality of relay-transmitting station systems are separately connected to the central fixed station system and a plurality of terminal station systems arranged along a trunk road or the like are connected to the relay-transmitting station systems.

Furthermore, the present invention is a portable telephone system comprising a radio modem connected with a network to perform modulation/demodulation between a circuit frequency electrical signal and a radio frequency electrical signal, a central fixed station system connected to the radio modem to perform conversion between a radio frequency electrical signal and an optical signal, a relay-transmitting station system connected to the central fixed station system through an optical fiber cable to relay-transmit an optical signal, and a terminal station system connected to the relay-transmitting station system through an optical fiber cable to perform conversion between an optical signal and a radio frequency electrical signal and moreover perform radio communication with a portable telephone in accordance with a radio frequency electrical signal, wherein a relay-transmitting station system is connected to the central fixed station system and a plurality of terminal station systems arranged in a building are connected to the relay-transmitting station system.

Moreover, in the above portable telephone system, it is permitted that the radio modem has a function as a terminal station for directly performing radio communication using a radio frequency electrical signal with a portable telephone.

Furthermore, it is possible to construct the following optical transmission system for mobile communication by using the above-described systems of the present invention.

The optical transmission system for mobile communication is an optical transmission system for mobile communication for connecting a mobile communication unit for performing radio communication with a terminal station in accordance with a radio frequency electrical signal to a network, wherein a converting station for performing conversion between a radio frequency electrical signal and an optical signal is connected to a network through an electrical signal transmission cable, a relay-transmitting station for distributing and coupling optical signals is connected to the converting station through upward and downward optical fiber cables, a plurality of terminal stations for performing radio communication with a mobile communication unit and conversion between an electrical signal and an optical signal are connected to the relay-transmitting station through upward and downward optical fiber cables, the converting station has a radio modem connected to a network through an electrical signal transmission cable to perform modulation/demodulation between a circuit frequency electrical signal and a radio frequency electrical signal and a central station for performing conversion between a radio frequency electrical signal to be processed by the radio modem and an optical signal to be transmitted through an optical fiber cable.

That is, the optical transmission system for mobile communication is an optical transmission system for mobile communication for connecting a mobile communication unit of performing radio communication with a terminal station in accordance with a radio frequency electrical signal to a network, wherein a converting station constituted of a radio modem connected to the network to perform modulation/demodulation between a circuit frequency electrical signal and a radio frequency electrical signal and a central station for performing conversion between a radio frequency electrical signal to be processed by the radio modem and an optical signal to be transmitted through an optical fiber cable is connected to the network through an electrical signal transmission cable, a relay-transmitting station for distributing and coupling optical signals is connected to the converting station through upward and downward optical fiber cables, a plurality of terminal stations for performing radio communication with the mobile communication unit and conversion between an electrical signal and an optical signal are connected to the converting station through upward and downward optical fiber cables, the converting station and relay-transmitting station are connected each other by a small number of optical fiber cables like the case of the branch type, and the relay-transmitting station and a plurality of terminal stations are connected each other by optical fiber cables like the case of the star type so as to be respectively independent.

Moreover, in the case of the optical transmission system for mobile communication, the radio modem and the central station are radio-connected each other in accordance with a radio frequency electrical signal.

That is, in the case of the optical transmission system for mobile communication, because the radio modem and the central station are constituted by radio-connecting the modem with the station in accordance with a radio frequency electrical signal, the flexibility of the central station is further improved.

Moreover, in the case of the optical transmission system for mobile communication, the radio modem also has a base-station function for connecting a mobile communication unit to a network by performing radio communication with the mobile communication unit.

That is, in the case of the optical transmission system for mobile communication, design of the system is simplified by constituting a radio modem so as to also have a base-station function for connecting a radio communication unit to a network by performing radio communication with a mobile communication unit and realize combined use with the base station of a normal mobile communication system or allow the optical transmission system to use an existing base station.

Moreover, in the case of the optical transmission system for mobile communication, a plurality of radio modems are used correspondingly to a communication system, and a coupler for coupling a plurality of radio frequency electrical signals modulated by a plurality of radio modems and output a coupled signal to a central station and a distributor for distributing radio frequency electrical signals converted by the central station to corresponding radio modems in accordance with a communication system are included.

That is, the optical transmission system for mobile communication is constituted by including a plurality of radio modems correspondingly to a communication system, a coupler for coupling a plurality of radio frequency electrical signals modulated by these plurality of radio modems and outputting a synthesized signal to a central station, and a distributor for distributing the radio frequency electrical signals converted by the central station to corresponding radio modems in accordance with a communication system so that a portable telephone system can correspond to a plurality of communication systems, such as analog and digital systems or TDMA and CDMA systems.

Moreover, in the case of the optical transmission system for mobile communication, a plurality of relay-transmitting stations are connected to a converting station through upward and downward optical fiber cables and the converting station is provided with an optical distributor for distributing an optical signal converted from radio frequency electrical signals into a plurality of optical signals to be transmitted to relay-transmitting stations through downward optical fiber cables, a plurality of photoelectric converters for converting optical signals transmitted from a plurality of relay-transmitting stations through upward optical fiber cables into radio frequency electrical signals, and an electric coupler for coupling a plurality of radio frequency electrical signals converted by a plurality of photoelectric converters.

That is, in the case of the optical transmission system for mobile communication, a plurality of relay-transmitting stations are connected to a converting station through upward and downward optical fiber cables and the converting station has an optical distributor for distributing optical signals converted from radio frequency electrical signals to a plurality of optical signals to be transmitted to the relay-transmitting stations through downward optical fiber cables, a plurality of photoelectric converters for converting optical signals transmitted from a plurality of relay-transmitting stations through upward optical fiber cables into radio frequency electrical signals, and an electrics coupler for coupling a plurality of radio frequency electrical signals converted by a plurality of photoelectric converters to perform up communication without performing optical coupling causing optical beat noises.

Moreover, in the case of the optical transmission system for mobile communication, a plurality of relay-transmitting stations are connected to a converting station through upward and downward optical fiber cables, the converting station is provided with an optical distributor for distributing optical signals converted from radio frequency electrical signals to a plurality of optical signals to be transmitted to the relay-transmitting stations through downward optical fiber cables, a plurality of photoelectric converters for converting optical signals transmitted from a plurality of relay-transmitting stations through upward optical fiber cables into radio frequency electrical signals, and a plurality of receiving sections for demodulating a plurality of radio frequency electrical signals converted by a plurality of photoelectric converters to apply reception diversity processing to signals sent from a certain mobile communication unit received by a plurality of terminal stations connected to different relay-transmitting stations by these receiving sections.

That is, in the case of the optical transmission system for mobile communication, a plurality of relay-transmitting stations are connected to a converting station through upward and downward optical fiber cables and the converting station is constituted of an optical distributor for distributing optical signals converted from radio frequency electrical signals to a plurality of optical signals to be transmitted to the relay-transmitting signals through downward optical fiber cables, a plurality of photoelectric converters for converting optical signals transmitted from a plurality of relay-transmitting stations through upward optical-fiber cables into radio frequency electrical signals, and a plurality of receiving sections for demodulating a plurality of radio frequency electrical signals converted by a plurality of photoelectric converters to apply reception diversity processing to signals sent from a certain mobile communication unit received by a plurality of terminal stations connected to different relay-transmitting stations by these receiving sections.

DETAILED DESCRIPTION OF THE INVENTION

Figure 7:
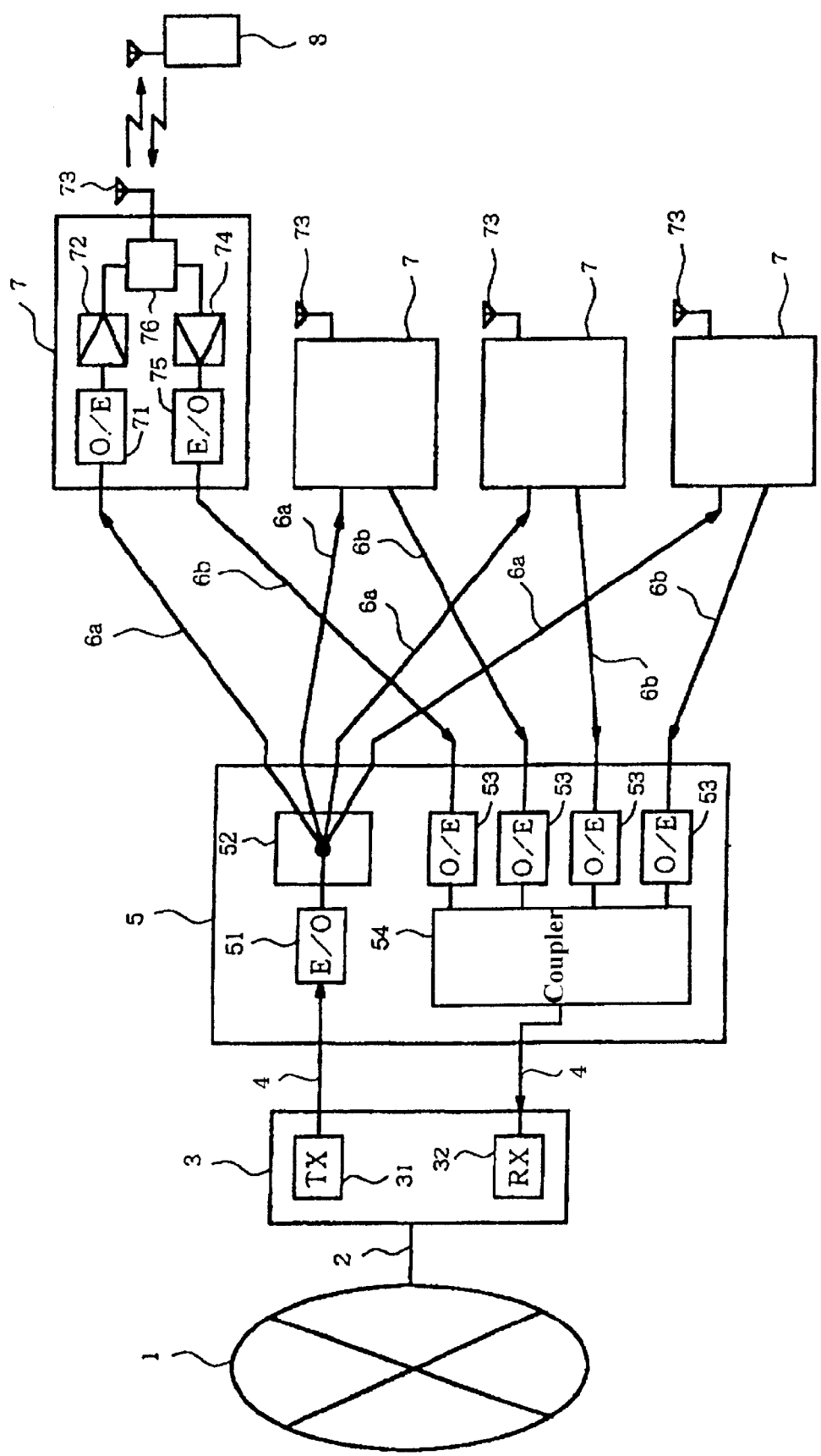
FIG. 7 is an illustration showing a configuration of a conventional star-type system.

The present invention is specifically described by referring to embodiments. To clarify the gist of the present invention, a portion same as that of conventional configurations shown in FIGS. 7 and 8 is provided with the same symbols and duplicate description is omitted.

Figure 1:
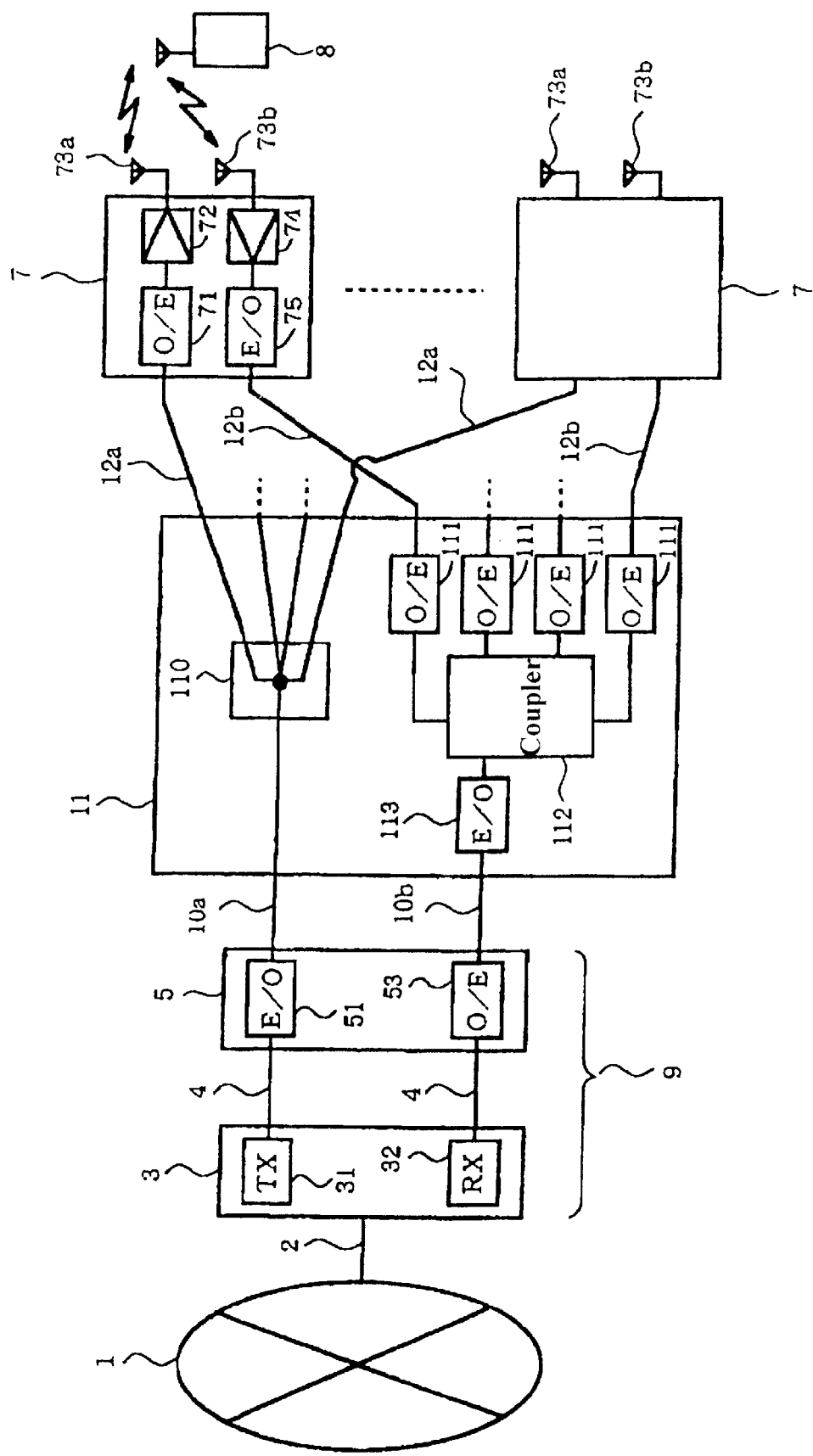
FIG. 1 is a block diagram of the optical transmission system for mobile communication of a first embodiment of the present invention.

FIG. 1 shows a configuration of the optical transmission system for mobile communication of the first embodiment of the present invention.

Figure 8:
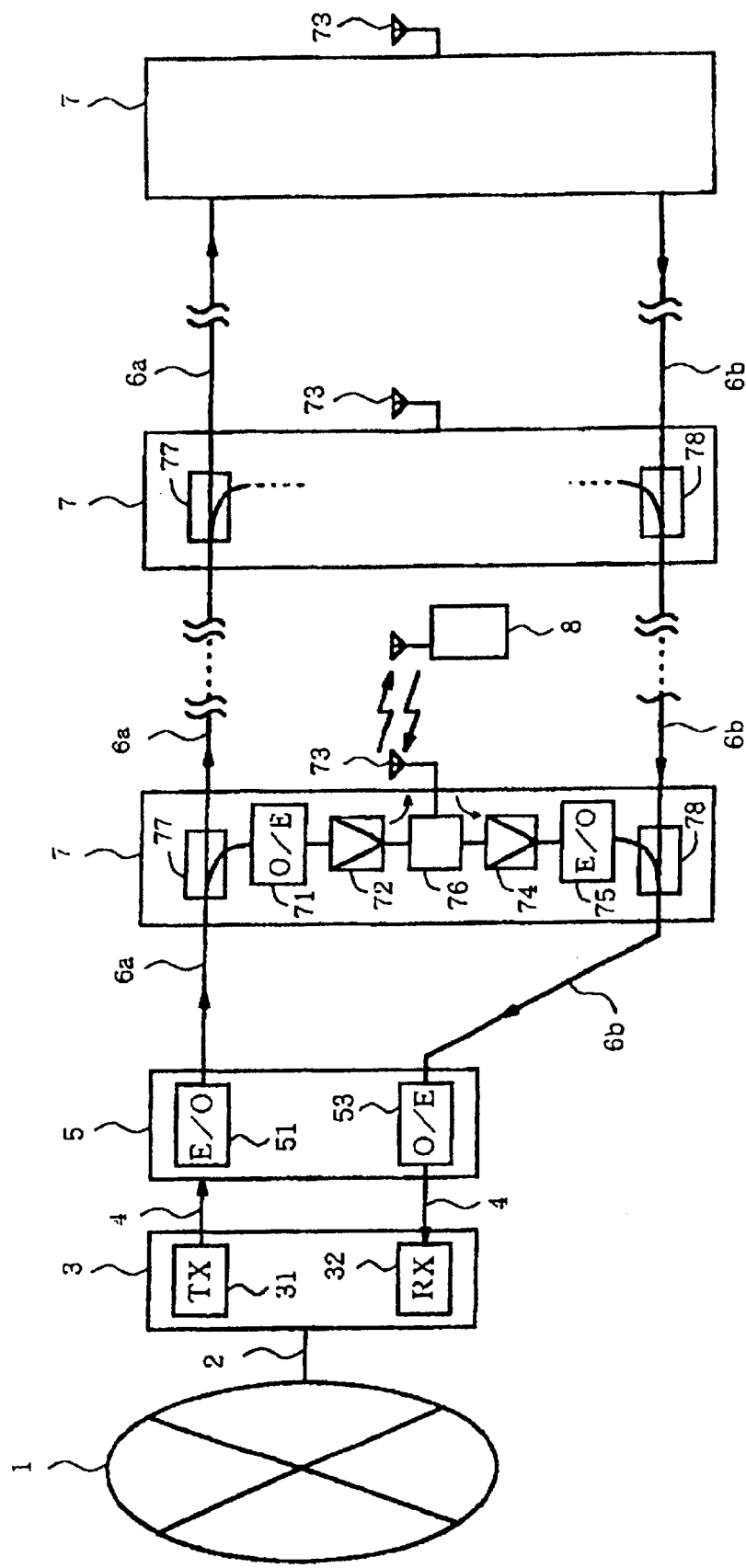
FIG. 8 is an illustration showing a configuration of a conventional multicipital system.

In the case of this embodiment, the configuration from a network 1 up to a radio modem 3 and a central fixed station 5 is the same as the multicipital system shown in FIG. 8, in which a relay-transmitting station 11 is connected to the central fixed station 5 by a downward optical fiber cable 10$a$ and an upward optical fiber cable 10$b$.

A converting station 9 of the present invention is constituted of the radio modem 3 and the central fixed station 5. In the case of this embodiment, a flexibility for setting the central fixed station 5 is realized by connecting the radio modem 3 with the central fixed station 5 through an electrical signal transmission cable 4. In the case of this embodiment, however, it is also permitted to constitute the radio modem 3 and the central fixed station 5 as one body.

Moreover, in the case of this embodiment, a plurality of terminal fixed stations 7 are connected to the relay-transmitting stations 11, respectively, by a pair of downward and upward optical fiber cables 12$a$ and 12$b$ and this portion is similar to the configuration in which terminal fixed stations are connected to the central fixed station by the start-type system shown in FIG. 7.

The relay-transmitting station 11 is provided with an optical distributor (start coupler) 110 for distributing optical signals transmitted from the central fixed station 5 to downward optical fiber cables 12$a$ and a downward optical signal converted from a radio frequency electrical signal by the E/O 51 of the central fixed station 5 is transmitted to the O/E 71 of each terminal fixed station 7 through each downward optical fiber cable 12$a$.

Moreover, the relay-transmitting station 11 is provided with a plurality of optical-electrical converters (O/E) 111 connected to upward optical fiber cables 12$b$ and an upward optical signal converted from a radio frequency electrical signal by the E/O 75 of each terminal fixed station 7 is reconverted into the original radio frequency electrical signal by each O/E 111.

Furthermore, the relay-transmitting station 11 is provided with a coupler 112 for coupling the radio frequency electrical signals reconverted by each O/E 111 and an optical-electrical converter (O/E) 113 for reconverting the coupled radio frequency electrical signal into an upward optical signal, in which radio frequency electrical signals sent from a plurality of mobile communication units 8 received by each terminal fixed station 7 are coupled and converted into an upward optical signal and transmitted to the O/E 53 of the central fixed station 5 through the upward optical fiber cable 10$b$. Thus, because this embodiment reconverts optical signals into electrical signals and couples the electrical signals, optical beat noises are prevented from occurring.

According to the optical transmission system having the above configuration, by using the relay-transmitting station 11, advantages same as those of the multicipital type are obtained that optical transmission is performed from the converting station 9 up to the relay-transmitting station 11 through a pair of upward and downward optical fiber cables 10$a$ and 10$b$ and laying of an optical fiber transmission path is simplified. Moreover, advantages same as those of the star type are obtained that optical transmission is performed from the relay-transmitting station 111 up to each terminal fixed station 7 through a pair of upward and downward optical fiber cables 12$a$ and 12$b$, individuality of each terminal fixed station 7 is obtained, a high setting flexibility is realized, and each terminal fixed station can be easily set at a place having a complicated structure such as an underground street.

Moreover, the terminal fixed station 7 of this embodiment is provided with a transmitting antenna 73$a$ and a receiving antenna 73$b$ for performing radio communication with the mobile communication unit 8. Therefore, it is also permitted to constitute this embodiment like the conventional example shown in FIG. 7 though the antenna sharing unit 76 is not included.

In the case of downward communication by this embodiment, a circuit frequency electrical signal sent from the network 1 is modulated into a radio frequency electrical signal by the modulating-transmitting section 31 of the radio modem 3, and the radio frequency electrical signal, is converted into an analog optical signal by the E/O 51 of the central fixed station 5 and transmitted to the relay-transmitting station 11 through the single downward optical fiber cable 10a. Then, the relay-transmitting station 111 distributes the optical signal by the star coupler 110 and transmits the signals to each terminal fixed station 7 through each downward optical fiber cable 12a. Each terminal fixed station 7 reconverts a received optical signal into the original radio frequency electrical signal by the O/E 71, amplifies the radio frequency electrical signal by the amplifier 72 according to necessity, and radio-transmits the signal to the mobile communication unit 8 from the transmitting antenna 73a.

Moreover, in the case of upward communication by this embodiment, radio frequency electrical signals radio-transmitted from the mobile communication unit 8 are received by a receiving antenna 73b of the terminal fixed station 7, the received radio frequency electrical signals are amplified by the amplifier 74 according to necessity and converted into analog optical signals by the E/O 75, and the optical signals are transmitted to the relay-transmitting station 11 through the upward optical fiber cables 12b. Then, the relay-transmitting station 11 converts the optical signals into radio frequency electrical signals by the O/E 111, couples these radio frequency electrical signals by the coupler 112, and converts a coupled electrical signal into an optical signal again by the E/O 113. Then, the optical signal is transmitted to the central fixed station 5 through the single upward optical fiber cable 10b. Then, the central fixed station 5 reconverts an optical signal received from each up optical fiber cable 10b into the original radio frequency electrical signal by the O/E 53 and transmits the radio frequency electrical signal to the radio modem 3. The radio modem 3 demodulates the radio frequency electrical signal into a circuit frequency electrical signal by the receiving-demodulating section 32 and transmits the circuit frequency electrical signal to the public network 1.

Figure 2:
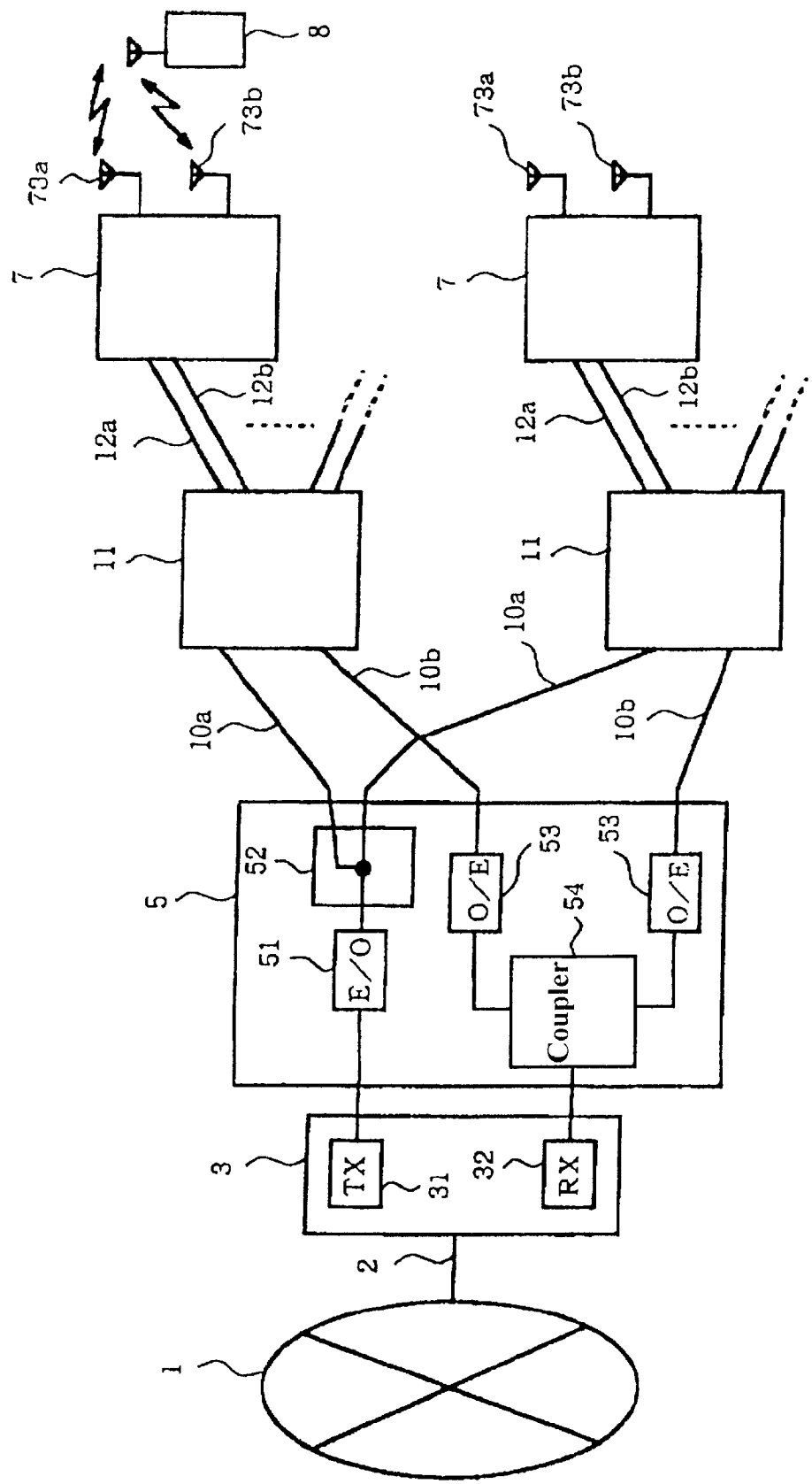
FIG. 2 is a block diagram of the optical transmission system for mobile communication of a second embodiment of the present invention.

FIG. 2 shows a configuration of the optical transmission system for mobile communication of the second embodiment of the present invention.

Because the second embodiment is obtained by modifying the first embodiment, description of portions same as those of the first embodiment is omitted, but modified portions are described below.

This embodiment is provided with a plurality of relay-transmitting stations 111 (two stations in the case of this embodiment) having the same configuration as the first embodiment and a plurality of terminal fixed stations 7 having the same configuration as the first embodiment are connected to these relay-transmitting stations 11 through pairs of upward and downward optic al fiber cables 12a and 12b similarly to the case of the first embodiment.

Moreover, a central fixed station 5 of this embodiment is provided with an optical distributor (star coupler) 52 for distributing optical signals converted by an E/O 51 equal to the number of relay-transmitting stations 11 and the distributed optical signals are transmitted to relay-transmitting stations 11 through downward optical fiber cables 10a.

Moreover, the central fixed station 5 of this embodiment is provided with a number of O/E 53 equal to the number of relay-transmitting stations 11. Optical signals are transmitted to the O/E 53 from the relay-transmitting stations 111 through upward optical fiber cables 10b. Radio frequency electrical signals converted by the O/E 53 are coupled by a coupler 54 and transmitted to a receiving-demodulating section 32 of a radio modem 3.

According to the optical transmission system having the above configuration, advantages same as those of the first embodiment are obtained. Moreover, by arranging a plurality of relay-transmitting stations 11 in different directions at both sides of the central fixed station 5, advantages are obtained that a plurality of terminal fixed stations 7 can be set about the central fixed station 5 without greatly lengthening an optical fiber cable and a lot of terminal fixed stations 7 can be easily distributed in a wide range in an underground street having a complicated structure.

Upward and downward communications by this embodiment are performed by every relay-transmitting station 1 similarly to the case of the first embodiment. In the case of upward communication, signals are coupled by the above coupler 54 in accordance with a signal format in which no optical beat noise is generated.

Figure 3:
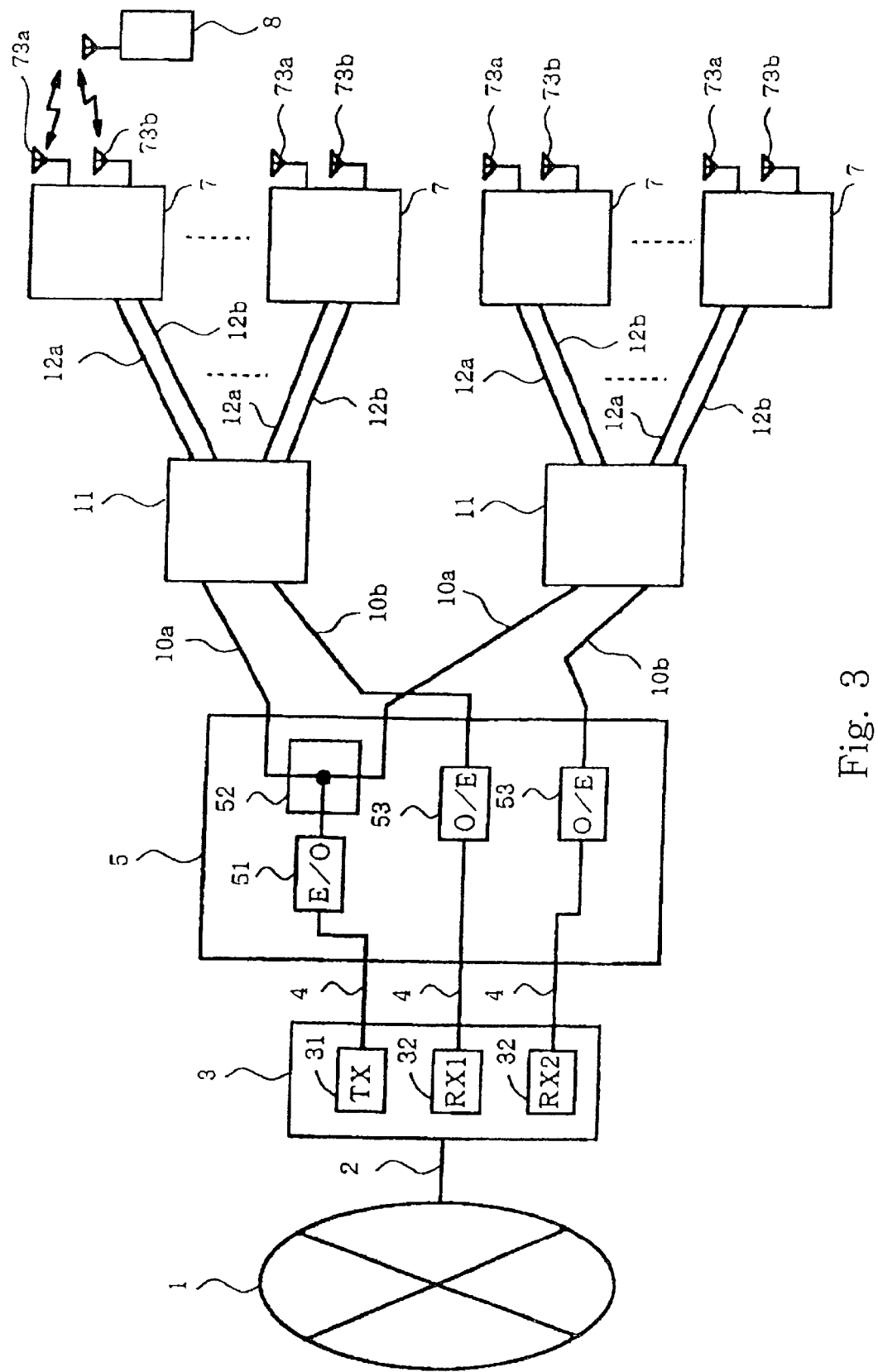
FIG. 3 is a block diagram of the optical transmission system for mobile communication of a third embodiment of the present invention.

FIG. 3 shows a configuration of the optical transmission system for mobile communication of the third embodiment of the present invention.

The third embodiment is obtained by modifying the second embodiment. Therefore, description of portions same as that of the second embodiment is omitted and modified portions are described below.

This embodiment is provided with a plurality of relay-transmitting stations 11 (two stations in the case of this embodiment) similarly to the case of the second embodiment and reception diversity is executed by upward optical signals transmitted from these relay-transmitting stations 11 (that is, signals received from a mobile communication unit 8). For this embodiment, it is preferable to arrange terminal fixed stations 7 so that at least two terminal fixed stations 7 connected to different relay-transmitting stations 11 can receive radio signals from the same mobile communication unit 8.

To execute the above reception diversity, a central fixed station 5 of this embodiment is provided with a number of O/E 53 equal to the number of relay-transmitting station 11 and an optical signal is transmitted to each O/E 53 from each relay-transmitting station 11 through an upward optical fiber cable 10b. Moreover, a radio modem 3 of this embodiment is provided with a number of receiving-demodulating sections 32 equal to the number of O/E 53 and upward radio frequency electrical signals are input to the receiving-demodulating sections 32 from different O/E 53 and reception diversity is executed.

Figure 4:
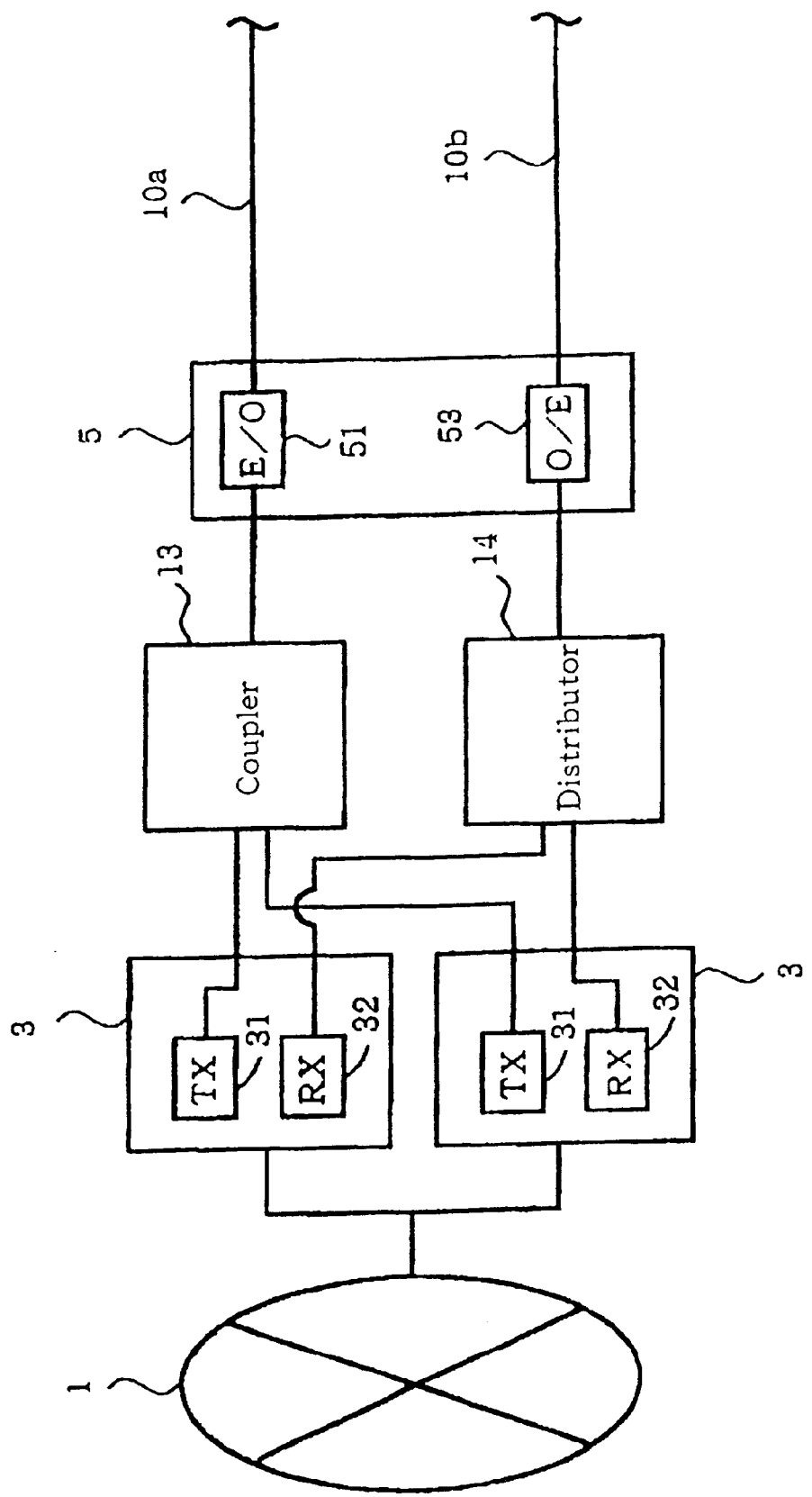
FIG. 4 is a block diagram of an essential portion of the optical transmission system for mobile communication of a fourth embodiment of the present invention.

FIG. 4 shows a configuration of an essential portion of the optical transmission system for mobile communication of the fourth embodiment.

This embodiment is obtained by modifying the first embodiment so as to support a plurality of different communication systems (two systems in the case of this embodiment). Therefore, description of portions same as those of the first embodiment is omitted and modified portions are described below.

This embodiment is provided with a plurality of radio modems 3 different from each other in communication system (type) and moreover provided with a coupler for coupling downward radio frequency electrical signals sent from modulating-transmitting sections 31 of the radio modems 3 and a distributor 14 for distributing upward radio frequency electrical signals sent from a central fixed station 5 to demodulating-receiving sections 32 of the radio modems 3.

That is, in the case of this embodiment, downward radio frequency electrical signals different from each other in communication system demodulated by the radio modems 3 are coupled by the coupler 13, radio-transmitted to mobile communication units 8 through the central fixed station 5, relay-transmitting station 11, and terminal fixed station 7, and received by a mobile communication unit 8 having a corresponding receiving system. Moreover, signals received from the mobile communication units 8 by the terminal fixed station 7 are transmitted through the central fixed station 5, distributed by the distributor 14, converted into circuit frequency electrical signals by a radio-modem 3 having a corresponding communication system, and transmitted to a network 1.

Figure 5:
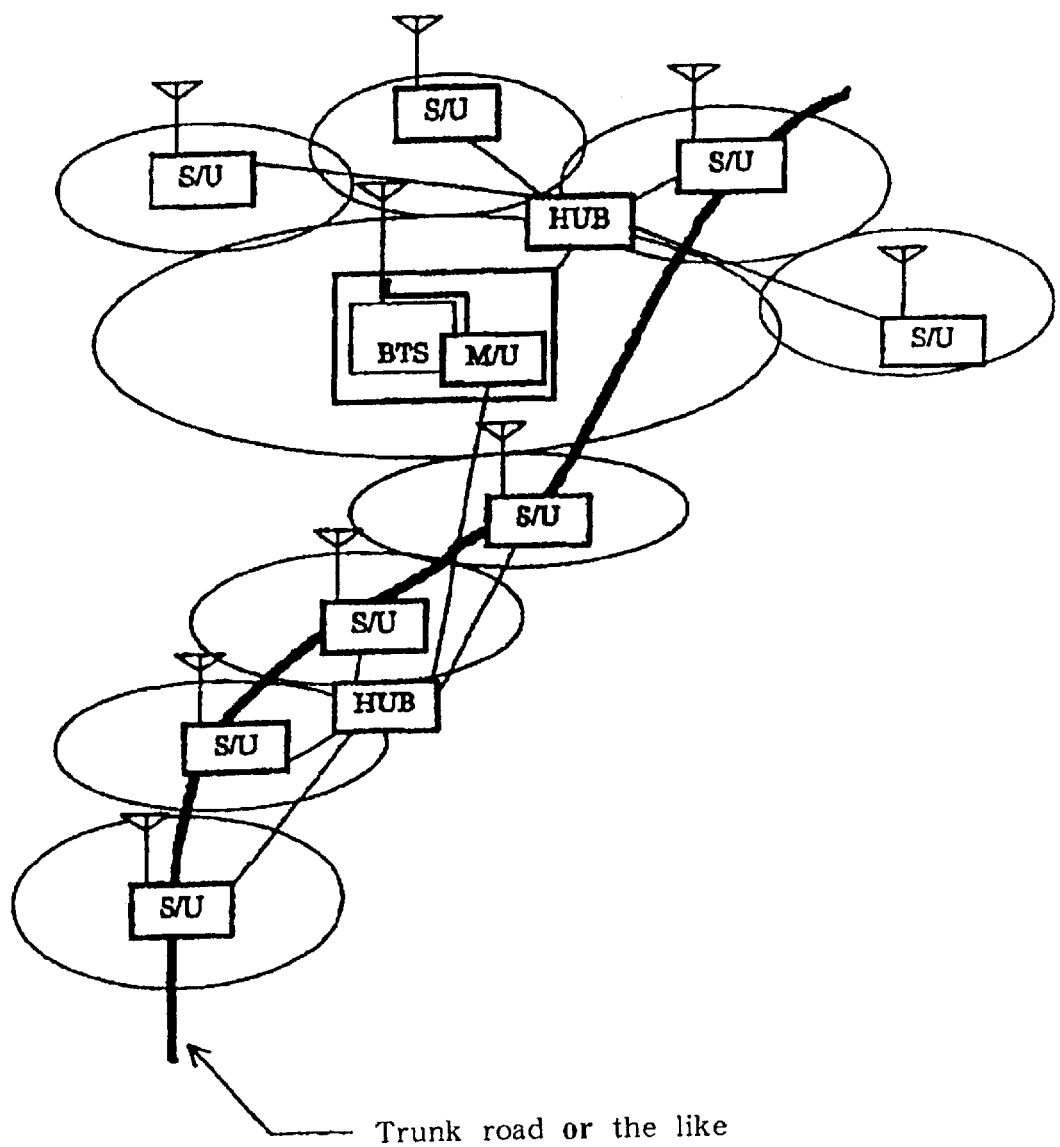
FIG. 5 is an illustration showing a configuration of an example in which the present invention is applied to a portable telephone system.

FIG. 5 shows an example in which the present invention is applied to a portable telephone system.

In the case of this applied example, two relay-transmitting stations (HUB) are separately connected to a radio modem (BTS) and a central fixed station (M/U) and a lot of terminal fixed stations (S/U) are arranged in a wide range along a trunk road or the like by applying the second embodiment of the present invention. Thus, a communication area of a base station comprising the radio modem (BTS) and central fixed station (M/U) is equivalently expanded.

Figure 6:
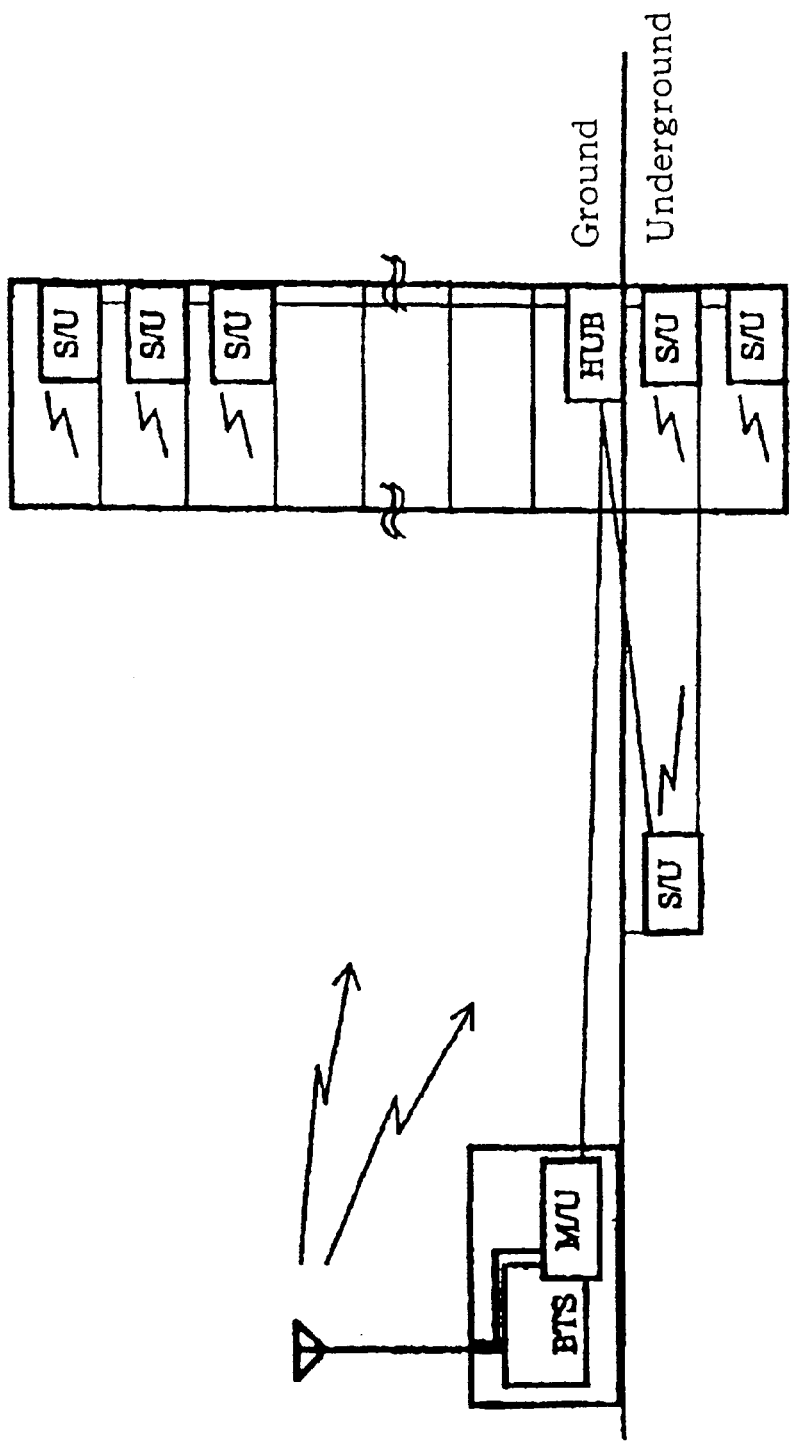
FIG. 6 is an illustration showing a configuration of another example in which the present invention is applied to a portable telephone system.

FIG. 6 shows another example in which the present invention is applied to a portable telephone system.

In the case of this applied example, a relay-transmitting station (HUB) is connected to a base station comprising a radio modem (BTS) and a central fixed station (M/U) and a lot of terminal fixed stations (S/U) connected to the relay-transmitting station (HUB) are set in ground floors in a building and moreover, in an underground street. A base station equivalently expands its communication area in the inside and underground spaces of a building which are dead zones.

As described above, according to the present invention, a system configuration similar to the multicipital type and a system configuration similar to the star type are united through a relay-transmitting station in an optical transmission system for mobile communication. Therefore, it is possible to realize advantages of the multicipital type such as reduction of the number of optical fiber cables and simplification of laying optical fiber cables and advantages of the star type including a large flexibility for setting a plurality of terminal stations.

Moreover, according to the present invention, advantages can be obtained that it is possible to increase a flexibility for setting a radio modem and a central station by radio-connecting them to each other in an optical transmission system for mobile communication, realize an ideal system configuration by sharing a radio modem with a base station, support a plurality of different communication systems by using a plurality of radio modems different from each other in communication system, avoiding optical beat noises damaging a communication quality from occurring by performing signal coupling in accordance with an electrical signal format, and improve a receiving sensitivity by using a plurality of receiving sections for receiving up signals and executing reception diversity.

What is claimed is:

1. An optical transmission system for connecting a mobile communication unit to a network, said optical transmission system comprising:

a converting station operable to perform conversion between a radio frequency electrical signal and an optical signal and adapted to be connected to the network through an electrical signal transmission cable, wherein the converting station has a radio modem adapted to be connected to the network through the electrical signal transmission cable and operable to perform modulation/demodulation between a network-frequency electrical signal and a radio frequency electrical signal and a central station operable to perform conversion between the radio frequency electrical signal processed by the radio modem and an optical signal to be transmitted through an optical fiber cable;

a relay-transmitting station operable to distribute and couple optical signals the relay-transmitting station being connected to the converting station through upward and downward optical fiber cables, and the relay-transmitting station having a plurality of optical-electrical converters;

a plurality of terminal stations operable to perform radio communication with the mobile communication unit and conversion between an electrical signal and an optical signal the terminal stations being connected to the optical-electrical converters, respectively, of the relay-transmitting station through upward and downward optical fiber cables;

at least one additional radio modem, wherein the radio modem and the at least one additional radio modem are a plurality of radio modems, the plurality of radio modems each being used in accordance with a communication mode;

a distributor; and a coupler operable to couple a plurality of radio frequency electrical signals modulated by the plurality of radio modems and output a coupled signal to the central station and the distributor, the distributor being operable to distribute a radio frequency electrical signal converted in the central station to a corresponding one of the radio modems in accordance with a communication mode.

* * * * *